United States Patent [19]

Wright

[11] 4,339,755

[45] Jul. 13, 1982

[54] PASSIVE-TYPE RANGE DETERMINING SYSTEM USING SCANNING RECEIVING DEVICES

[75] Inventor: James M. Wright, Bellevue, Wash.

[73] Assignee: The Boeing Company, Seattle, Wash.

[21] Appl. No.: 126,456

[22] Filed: Mar. 3, 1980

[51] Int. Cl.³ .............................................. G01S 5/04
[52] U.S. Cl. .............................. 343/112 D; 343/118; 364/458
[58] Field of Search .......... 343/118, 15, 13 R, 112 D; 364/458

[56] References Cited

U.S. PATENT DOCUMENTS

| | | | |
|---|---|---|---|
| 2,509,207 | 5/1950 | Busignies | 343/118 |
| 2,794,594 | 6/1957 | Ergen et al. | 364/458 X |
| 2,919,350 | 12/1959 | Taylor et al. | 343/112 C X |
| 3,406,397 | 10/1968 | Easton et al. | 343/15 |
| 3,515,342 | 6/1970 | Brunk | 343/15 X |
| 3,789,410 | 1/1974 | Smith et al. | 343/112 D |

Primary Examiner—Malcolm F. Hubler

Attorney, Agent, or Firm—Christensen, O'Connor, Johnson & Kindness

[57] ABSTRACT

A pair of scanning, directional receiving antennas mounted in spaced relation on a monitoring aircraft are synchronously driven at a given scan rate $\omega_s$ and at the same phase angle with respect to the broadside of the antenna pair so that the receiving beams of the antennas are always parallel. A non-scanning source of RF radiation, located at an unknown range from the monitoring aircraft, emits radiation that is received by the scanning antennas at a slight time differential $t_{21}$. The received source radiation is converted by separate receiving channels into early and late arriving signals, from which a time interval signal representing $t_{21}$ is produced. Concurrently therewith, an angle of arrival $\phi$ of the source radiation is detected and a signal representative thereof is produced. Also, signals are generated that represent the scan rate $\omega_s$ of the receiving antennas and a distance d equal to the separation between the antennas. From these signals, a range signal R is produced that corresponds to the distance between the monitoring aircraft and the source of RF radiation.

10 Claims, 2 Drawing Figures

PASSIVE-TYPE RANGE DETERMINING SYSTEM USING SCANNING RECEIVING DEVICES

BACKGROUND OF THE INVENTION

This invention pertains to passive-type range determining systems for measuring the distance (i.e., range) to a source of electromagnetic radiation.

There are certain navigational, surveillance and military operations in which it is desirable to passively determine the range between a monitoring position and a target or object, having a scanning source of electromagnetic radiation, such as emitted by a radar transmitting antenna. One example of such a system is described in a copending U.S. patent application, Ser. No. 080,533 filed Oct. 1, 1979, as a continuation-in-part application of Ser. No. 488,401 filed July 15, 1974, now abandoned, for SERVO-LOOP PROCESSOR, by Philip Jones and Moorfield Storey, Jr. As disclosed therein, signal monitoring equipment carried by a manned or unmanned aircraft, is capable of measuring the range to the emitter target without requiring maneuvers of the monitoring aircraft, which are time consuming and in some circumstances tactically impractical. The range is determined by measuring a small time differential that occurs between the receipt of the target's emitted scanning signal at first and second spaced-apart receiving antennas carried by a monitoring aircraft. In this example, the receiving antennas are mounted on the opposite wing tips of the monitoring aircraft such that a distant source of scanning RF radiation sweeps across the receiving antennas, causing relatively early and late arriving signals to be produced in separate receiving channels. In the above-mentioned patent application, a special, precision servo-loop processor is provided for resolving very small time differentials between the early and late channel signals. An electrical signal representing such time differential is then processed with other separately detected signals representing the scan rate of the source and an angle of arrival of the source radiation with respect to the receiving antennas, to develop a signal representing the range.

While systems of this nature are effective in determining the range to the source of transmission when it is of a scanning type, such systems are not capable of making a range measurement when the source of transmission is fixed or does not scan in a predictable fashion. Since the range determining function as characterized above, depends in part on information defining the rate at which the transmission sweeps across the spaced-apart receiving antennas, the absence of such sweeping or scanning of the source renders the measurement system ineffectual.

Accordingly, an object of the present invention is to provide a range determining method and apparatus capable of measuring the range to a non-scanning source of electromagnetic transmission. A related object is to provide such a range determining method and apparatus in which the source can be either scanning or non-scanning.

Another object of the invention is to provide a passive-type range determining apparatus that has the above noted capability, and which can be carried on board a moving carrier, such as on a manned or unmanned aircraft.

Additionally, the invention has the features of eliminating the need to measure the scan rate of the source of transmission (because the range measurement does not use source scanning information); and for the same reason, the invention does not need to rely on an assumed continuation of a previously measured rate of scanning of the source, which may not be a valid assumption should the rate be continuously changing in some unpredictable fashion during the ranging process.

SUMMARY OF THE INVENTION

In accordance with the principles of the invention, a range determining system is comprised of first and second directional receiving devices, such as antennas, of the scanning type, arrayed at a monitoring location in which the devices are separated by a distance d. These devices are then driven at a common scanning rate $\omega_s$ and synchronized so that at any instant they are oriented at the same phase angle with respect to the broadside of the arrayed pair (defined by an imaginary straight line drawn between the receiving devices). Synchronization in this manner maintains the receiving beams of the directional devices parallel to each other. First and second signal receivers are separately connected to the first and second devices, respectively, for developing early and late arriving signals in response to a source of electromagnetic transmission oriented generally boradside to the arrayed pair. Processor circuitry is connected to the first and second signal receivers for developing a signal representing the time differential $t_{21}$ between early and late arriving signals, and this time differential signal is then fed along with other signals representing a detected angle of arrival $\phi$ of the source of transmission to the arrayed pair, and a signal representing the distance d between the pair of arrayed receiving antennas, to processing circuitry for developing a range signal R that varies according to the function:

$$R = (d \cos \phi)/(t_{21}\omega_s)$$

The present invention provides an effective method and apparatus for determining the range parameter R, to a distant source of electromagnetic transmission, in which the source can be of either a scanning or non-scanning nature. For non-scanning transmission sources, the lack of scan rate information is supplanted by arranging and scanning the spaced receiving devices, as characterized above, to develop the needed signal information that enables the determination of the range.

While in the embodiment disclosed herein, the source of electromagnetic radiation is a radio frequency emitter, such as a radar transmitter, the invention is applicable to other wave lengths of radiation including infrared, visible light and even shorter wave lengths. Thus, for ranging in conjunction with infrared sources, the first and second scanning receiving devices are provided by directional radiation sensors responsive to infrared wave lengths.

Thus, to provide a complete disclosure of the invention, reference is made to the appended drawings and following description of one particular and preferred embodiment.

DETAILED DESCRIPTION

Figure 1:
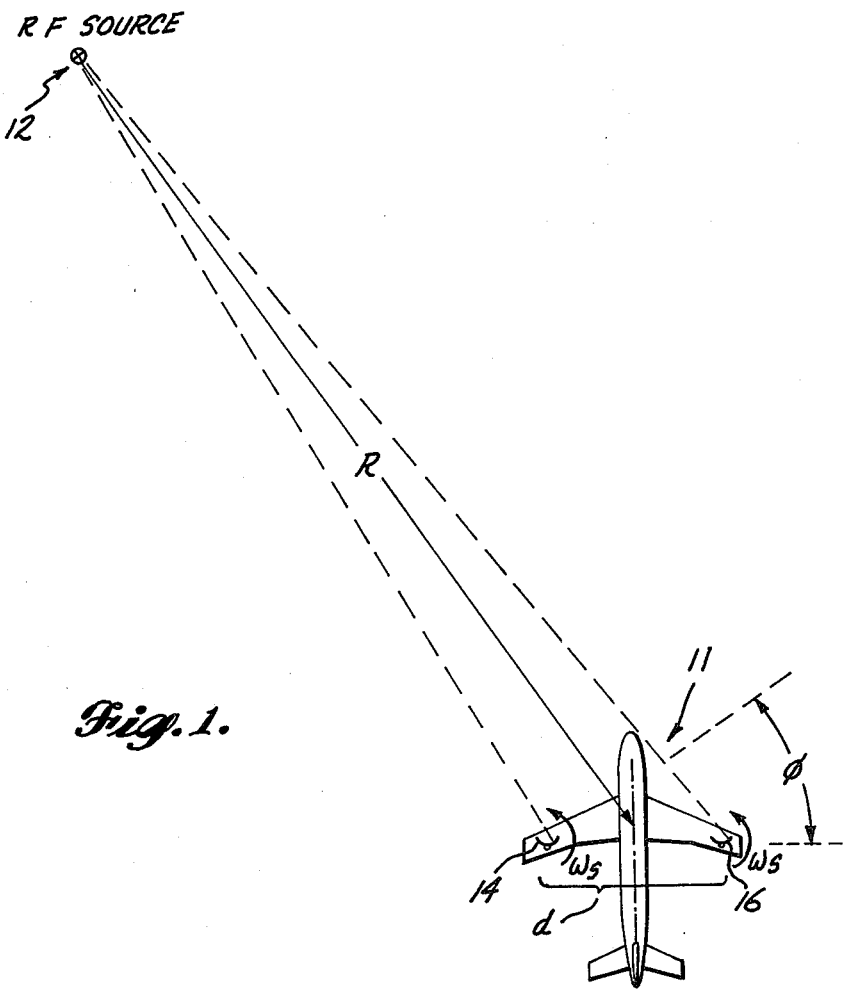
FIG. 1 is a diagrammatic, plan view of the geometrical orientation between a monitoring aircraft, equipped with a range determining system in accordance with the invention, and a distant source of RF radiation.

With reference to FIG. 1, the present invention is disclosed by reference to a range determining system, carried by an aircraft 11, for measuring the range R to a distant source 12 of RF transmission. Although the monitoring station, here provided by aircraft 11, need not be airborne or even mobile, a prime application of the invention is its use on a manned or unmanned aircraft in which there is a need to make passive, instantaneous measurements of the range R, for the reasons discussed hereinabove.

For this purpose, aircraft 11 is equipped with first and second directional, scanning antennas 14 and 16, which are separated on the aircraft to the maximum extent possible for optimum range resolution. In this case, antennas 14 and 16 are located adjacent the wing tips of aircraft 11 and the distance d separating the antennas corresponds approximately to the aircraft's wing span. A scan driver carried on aircraft 11 rotates antennas 14 and 16 in unison, at the same scan rate $\omega_s$ and at the same angular phase relationship relative to the broadside of the spaced-apart antenna pair. Depending upon the range and orientation of source 12 with respect to aircraft 11, antennas 14 and 16 receive RF transmissions at slightly different times due to the fact that the principal receiving axes of the antennas are parallel to one another and do not converge on a distant focal point, such as at source 12. Thus, as antennas 14 and 16 scan across source 12 in the counterclockwise direction as shown in FIG. 1, antenna 14 is receptive of the RF transmission from source 12 at a time slightly in advance of the receipt of the same transmission by antenna 16. The resulting time differential is used together with other signal parameters described hereinbelow, to automatically and almost instantaneously determine the range R. For this purpose, receiving and signal processing circuitry 24 (FIG. 2) is carried on board aircraft 11 and is responsive to transmissions received by antennas 14 and 16, and to a signal from the scan drive representing the scan rate $\omega_s$, and to signals representing a detected angle of arrival $\phi$ and antenna separation distance d, to produce an output range signal, representing R, that continuously varies as a function of the measured parameters.

Figure 2:
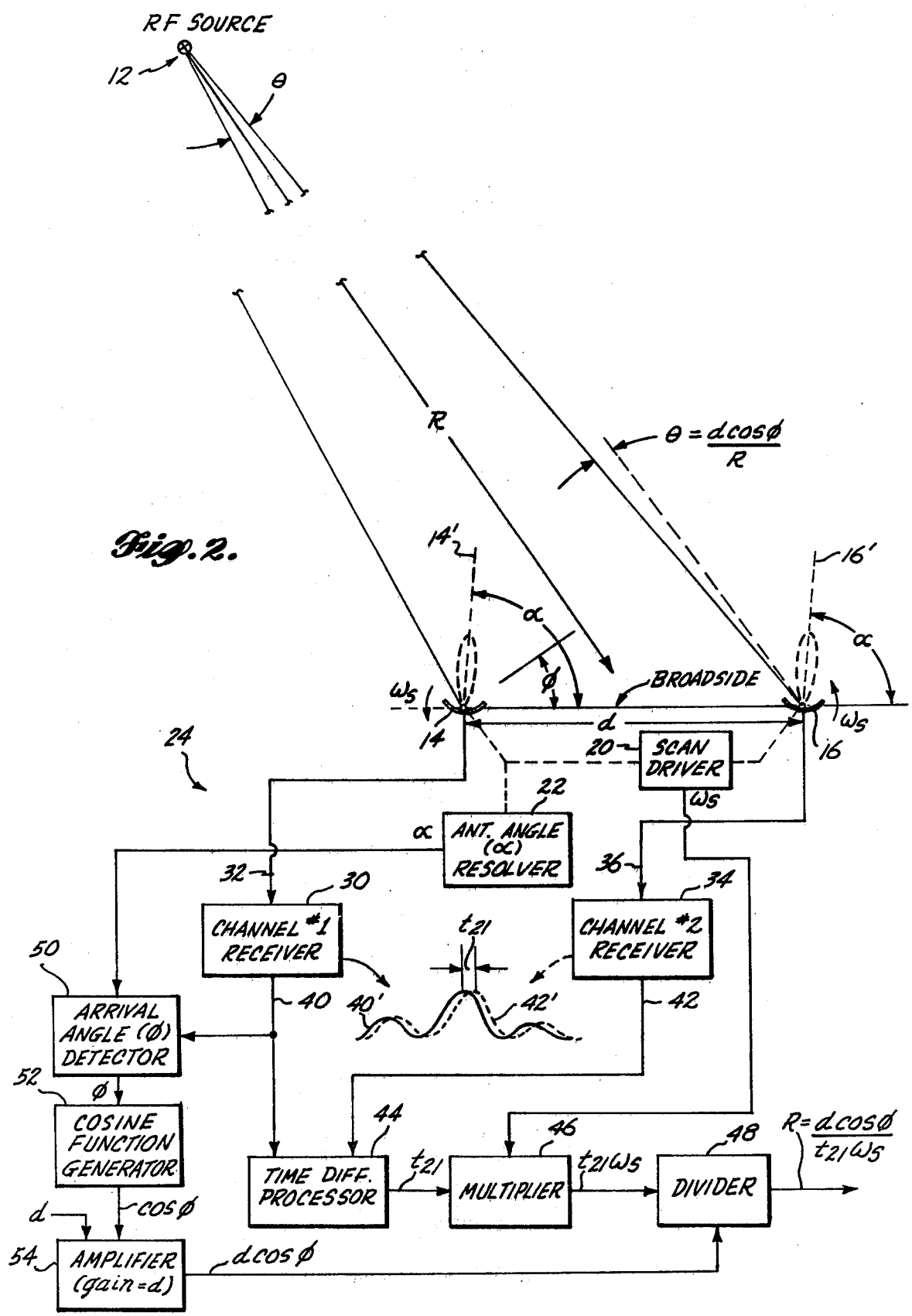
FIG. 2 is a geometrical and electrical block diagram of the range determining system in accordance with the currently preferred embodiment of the invention.

Now with reference to the greater detail of the preferred embodiment as it is shown in FIG. 2, the separation of antennas 14 and 16 by the distance d, subtends, at source 12, a relatively small angle designated $\theta$. Under most measurement conditions, the range R will be many times greater than the antenna separation distance d, such that typically the angle $\theta$ will be on the order of 10 degrees or less. The angle of arrival $\phi$, with respect to the broadside of the pair of antennas 14 and 16, is measured as indicated in FIG. 2, with respect to antenna 14. However, it will be appreciated that since the distance d is assumed to be so very much smaller than the range R, the angle of arrival $\phi$ will be essentially the same at both antennas 14 and 16. Furthermore, the angle $\theta$ can be represented as a function of d, the cos of the angle of arrival, $\phi$, and the unknown range R according to the equation:

$$\sin \theta = (d \cos \phi)/R$$

Using the small angle approximation of $\sin \theta \cong \theta$, the foregoing equation simplifies to:

$$\theta = (d \cos \phi)/R$$

Antennas 14 and 16 are rotated in unison by a scan driver 20 which determines the scan rate $\omega_s$, and maintains the necessary synchronization so that the directional axes of both antennas always have the same phase angle $\alpha$ with respect to the broadside reference of the antenna pair. Thus the receiving beam axes 14' and 16' are always parallel.

Since directional axes 14' and 16' are always parallel, the above characterized angle $\theta$ represents the amount of angular offset between source 12 and one of the pair of antennas, when the other antenna is pointed directly at source 12. Thus, in FIG. 2 with antennas 14 and 16 rotating counterclockwise at the same rate $\omega_s$, and in phase synchronization, when the axis 14' of antenna 14 is pointing directly at source 12, the directional axis 16' of antenna 16 is angled slightly away from source 12 by the same, above-defined angle $\theta$.

In this embodiment, a signal is produced by scan driver 20 that represents the scan rate $\omega_s$ at which driver 20 is rotating antennas 14 and 16. Scan driver 20 is also linked, directly or indirectly to an antenna angle resolver 22 which is responsive to the angular rotation of antennas 14 and 16 and produces a signal representing the instantaneous value of the above-defined antenna phase angle $\alpha$.

Signal receiving and processing circuitry 24 is connected to antennas 14 and 16, scan driver 20 and angle resolver 22 and is responsive to source transmissions received by antennas 14 and 16 to produce an output signal related to the range R. In particular, circuitry 24 includes a channel #1 receiver 30 having an input 32 connected to antenna 14 and an output 40. A channel #2 receiver 34 has an input 36 connected to antenna 16 and an output 42. A time difference processor 44 is connected to outputs 40 and 42 of receivers 30 and 34, respectively, and has an output that develops a signal representing a time differential $t_{21}$ between early and late arriving signals received by antennas 14 and 16 in response to source 12. In the actual system, the directional axes 14' and 16' of antennas 14 and 16 are idealizations of practical antennas, which usually have a diverging beamwidth characterized by a main lobe of greatest sensitivity, and side lobes of lesser sensitivity.

To resolve early and late received signals which overlap due to the diverging angle of sensitivity of the receiving antennas, processor 44 may be provided by a circuit that is capable of detecting and measuring the magnitude of time displacement between two nearly identical signals that occur almost, but not quite at the same time. As an example, such nearly coincident signals may be produced by receivers 30 and 34 in response to received pulsed radar signals modulated by the main and side lobes that characterize the directional sensitivities of the receiving antennas 14 and 16. In such case, processor 44 may be a precision servo-loop processor of the kind disclosed in the above-identified U.S. application Ser. No. 488,401 now abandoned, for measuring the time shift $t_{21}$ between early and late pulsed radar signals.

The output of processor 44 is connected to one input of a multiplier 46, and the other input of multiplier 46 is connected to a signal output from scan driver 20 that represents the scan rate $\omega_s$. Thus, the output of multiplier 46 produces a signal representing the instantaneous value of the time differential $t_{21}$ times the scan rate $\omega_s$. A divider 48 has one input connected to receive the output of multiplier 46, and a second input for receiving a signal representing the antenna spacing distance d multiplied by the cosine of the angle of arrival $\phi$, derived in the manner described immediately below. In response to these inputs, divider 48 operates to divide the first input signal representing $t_{21}\omega_s$ into the second input signal representing d cos $\phi$, to produce a range signal R in which:

$$R = (d \cos \phi)/(t_{21}\omega_s)$$

To develop the signal having a value d cos $\phi$, circuitry 24 includes an arrival angle detector 50 which has a first input for receiving a signal representing the instantaneous value of the antenna phase angle $\alpha$, produced as described above by an output of angle resolver 22. A second input of detector 50 is connected to the output 40 of channel #1 receiver 30. In response to these two signals, detector 50, which may be provided by any of a number of conventional circuits, responds to a predetermined amplitude threshold of the output signal from receiver 30 and correlates the occurrence of that threshold amplitude with the instantaneous signal value of $\alpha$. Detector 50 thereby determines the angular position $\alpha$ of antenna 14 when its principal receiving axis 14' is directly aligned with source 12. Detector 50 then modifies the resulting signal so as to in effect subtract 90° from $\alpha$, and thereupon produces an output signal representing the angle of arrival $\phi$ with respect to the broadside of the pair of antennas 14 and 16, wherein:

$$\phi = \alpha - 90°$$

A cosine function generator 52 is connected to the output of angle detector 50 and in response to the signal representing $\phi$, produces another signal equal to cos $\phi$. An amplifier 54 modifies the gain of the output signal from generator 52 by a factor representing the antenna separation distance d and produces at an output thereof, a signal representing the value d cos $\phi$, which is fed to that input of divider 48 which forms the dividend of the range equation.

Operation

In using the range determining system of FIGS. 1 and 2, antennas 14 and 16 are continuously scanned at the same rate $\omega_s$, and with the same broadside phase angle $\alpha$. The scan rate $\omega_s$ is selected by scan driver 20 so as to provide a measurable time shift $t_{21}$ between the signals received by antennas 14 and 16. The particular scan rate $\omega_s$ will of course vary depending upon the directional sensitivity of antennas 14 and 16 and the magnitude of the range R that separates source 12 from antennas 14 and 16.

Assuming that antennas 14 and 16 are scanned in a counterclockwise direction as viewed in FIG. 2, and that source 12 is located generally broadside of the antenna pair, it will be appreciated that as the antennas sweep past the general location of source 12, the directional axis 14' of antenna 14 will be the first to pass across the point of origin of source 12. If source 12 is a pulsed radar transmission, receiver 30 will produce at output 40, a train of radar pulses amplitude modulated by the direction sensitive lobes of the antenna, resulting in a roughly sine wave-like envelope signal indicated by the solid line 40' in FIG. 2. Then with a slight time lag, directional axis 16' of antenna 16, lying parallel to axis 14 of antenna 14, will sweep across source 12, causing receiver 34 to produce an amplitude modulated train of pulses, the envelope of which is indicated by dotted line 42' in FIG. 2. Envelope signal 42' is thus nearly identical to envelope signal 40', but shifted in time by interval $t_{21}$. Processor 44 resolves the time difference $t_{21}$ and produces a signal representative thereof as described above.

Since $t_{21}$ represents the difference between the time at which antenna 14 is aligned with source 12, and the slightly later time at which antenna 16 is aimed at source 12, angle $\theta$ subtended by the spaced-apart antennas 14 and 16 can be represented by multiplying the time differential $t_{21}$ by the scan rate $\omega_s$ of the receiving antennas per such that:

$$\theta = t_{21}\omega_s$$

As described previously, the range R is geometrically related to $\theta$ (for small angles of about 10° or less) by the relationship:

$$\theta = (d \cos \phi)/R$$

so that R can be represented in terms of $t_{21}$ and $\omega_s$ by the equation:

$$R = (d \cos \phi)/(t_{21}\omega_s)$$

Thus signals representing the angle of arrival $\phi$, antenna separation distance d, receiving antenna scan rate $\omega_s$ and time differential $t_{21}$ are processed by cosine function generator 52, amplifier 54, multiplier 46 and divider 48, to yield a signal representing the range R at the output of divider 48. Usually, the antenna separation distance d will be a constant and can therefore be introduced into circuitry 24 by merely setting the gain of the signal representing cos $\phi$ to the appropriate level, such as by means of a fixed gain amplifier 54.

Although the embodiment of the invention disclosed herein produces an analog signal representing the range R, by means of a succession of analog signal computations, it will be appreciated that various alternative signal processing may be used in lieu of the disclosed circuitry 24. For example, the functions of circuitry 24 may be partly or entirely performed by special purpose digital processing circuitry and/or general purpose, programmable computer systems, while still operating in accordance with the principles of the invention.

Thus, the present invention provides a new and advantageous, passive range determining system in which the source 12 of electromagnetic transmission need not be a scanning source. Furthermore, although having the capability of measuring the range of non-scanning transmission sources, the invention will also operate with scanning sources. Thus a system such as disclosed above, may be installed on aircraft 11 and operated for the purpose of locating and monitoring the range of distant, unknown sources of electromagnetic radiation, which may be either scanning or non-scanning.

An additional advantage of the invention is that the monitoring circuitry need not measure the scan rate of the source, whereas other known passive ranging systems require supplemental circuits for this purpose. A related advantage is that present invention eliminates the need, present in other known ranging systems, to rely on an assumed continuation of a measured source scan rate, which rate may change in an unpredictable fashion, and be different at the time that the derivable range measurement is registered.

While only a particular embodiment has been disclosed herein, it will be readily apparent to persons skilled in the art that numerous changes and modifications can be made thereto including the use of equivalent means, devices and method steps, without departing from the principles of the invention. For example, the ranging system need not be carried on an aircraft, but rather can be mounted on any moving conveyance, such as a ground vehicle or ship, or if desired located at a fixed station. Furthermore, the invention is not limited to ranging on emitters of any particular wave length of electromagnetic radiation. For example, and as mentioned above, the source 12 can be of a wave length shorter than that of radio frequencies, including infrared radiation. In such case, antennas 14 and 16 are replaced by scanning means such as rotating sensors responsive to infrared wave lengths for receiving the source of radiation, and receivers 30 and 34 are adapted to amplify the output signals produced by the infrared sensors.

I claim:

1. An apparatus for determining the range of a source of electromagnetic transmission from a monitoring location, comprising:
    first and second directional receiving means each having a principal receiving axis for receiving the transmission when said axes are aligned with the source, said first and second receiving means being arrayed at relatively spaced-apart positions separated by a distance d at said monitoring location, and means for mounting said first and second receiving means for scanning;
    scan driver means for causing each of said first and second receiving means to scan at a predetermined scan rate $\omega_s$ and in phase synchronization so that any instant both said receiving means are oriented at the same angle $\alpha$ with respect to the broadside of said receiving means, and so that the principal receiving axes of said first and second receiving means are parallel;
    first and second channel electrical means connected to said first and second receiving means, respectively, for developing early and late arriving signals representing the receipt by said first and second receiving means of the transmission;
    means for measuring a time differential $t_{21}$ between early and late arriving signals developed by said first and second channel electrical means, and for producing a signal representing said time differential $t_{21}$;
    angle of arrival measurement means for measuring an angle $\phi$ at which the transmission arives at said monitoring location relative to said receiving means, and for producing a signal representing said angle $\phi$; and,
    range determining circuit means responsive to said signals representing said time differential $t_{21}$ and said angle of arrival $\phi$, for producing an output signal proportional to the range as a function of said signals representing said time differential $t_{21}$, said angle of arrival $\phi$, said separation distance d and said scan rate $\omega_s$.

2. The apparatus of claim 1 wherein said source produces electromagnetic transmission of radio frequencies, and wherein said first and second directional receiving means each comprise directional antennas for receiving radio frequencies.

3. The apparatus of claim 1 wherein the monitoring location is provided by a monitoring aircraft, and wherein the apparatus is effective to passively determine said range without requiring manuevers by the monitoring aircraft, and wherein the apparatus further comprises means for mounting said first and second receiving means on said monitoring aircraft separated by said distance d.

4. The apparatus of claim 3 wherein said means for mounting said first and second receiving means on said monitoring aircraft further comprises means for mounting said first and second receiving means on opposed wings of said aircraft.

5. The apparatus of claim 1 wherein said range determining circuit means comprises means responsive to said angle of arrival detector means for producing a signal representing $d \cos \phi$; and means responsive to said means for measuring said time differential for producing a signal representing $t_{21}\omega_s$; and means for dividing said signal representing $d \cos \phi$ by said signal representing $t_{21}\omega_s$.

6. The apparatus of claim 1, wherein said scan driver means includes means for producing a signal representing said scan rate $\omega_s$, and wherein said range determining circuit means comprises function generator means responsive to said angle of arrival detector means for producing a signal representing $d \cos \phi$, and multiplier means responsive to said means for measuring said time differential and to said means for producing said signal representing said scan rate $\omega_s$ for multiplying such signals to produce a signal representing $t_{21}\omega_s$, and divider means for dividing said signal representing $d \cos \phi$ by said signal representing $t_{21}\omega_s$.

7. The apparatus of claim 1 wherein said range determining circuit means comprises signal processing means for producing said output signal as the following function of said signals representing said time differential $t_{21}$, said angle of arrival $\phi$, said separation distance d and said scan rate $\omega_s$;

$$R = (d \cos \phi)/(t_2 \omega_s)$$

where R represents said output signal proportional to the range.

8. A method for determining the range of a source of electromagnetic transmission from a monitoring location, comprising the steps of:
    scanning first and second spaced-apart, directional receiving devices, which are sensitive to said electromagnetic transmission, at the same scan rate $\omega_s$ and in phase synchronization so that the principal directional receiving axes of said first and second receiving devices are maintained parallel;
    developing early and late arriving signals in response to the receipt by said first and second receiving devices of the electromagnetic transmission;
    resolving a time differential $t_{21}$ between the early and late arriving signals;
    detecting an angle of arrival $\phi$ at which the electromagnetic transmission arrives at said monitoring location; and,
    producing an output signal representing the range between said monitoring location and said source of electromagnetic transmission as a function of said resolved time differential $t_{21}$, said scan rate $\omega_s$, a distance d separating said first and second receiving devices, and the detected angle of arrival $\phi$.

9. The method of claim 8 wherein said monitoring location is on a monitoring aircraft, and said first and second receiving devices are mounted on said monitoring aircraft at a separation distance d for passively determining the range to a distant source of transmission without requiring maneuvers by said monitoring aircraft.

10. The method of claim 8 wherein said step of determining said range comprises the substeps of:
generating an electrical signal representing the function d cos $\phi$ in response to the step of detecting the angle of arrival $\phi$;
producing a signal representing the time differential $t_{21}\omega_s$ in response to the step of resolving said time differential $t_{21}$; and,
dividing the signal representing d cos $\phi$ by the signal representing $t_{21}\omega_s$ to produce a signal representing the range R.

* * * * *

UNITED STATES PATENT AND TRADEMARK OFFICE
CERTIFICATE OF CORRECTION

PATENT NO. : 4,339,755

DATED : July 13, 1982

INVENTOR(S) : James M. Wright

It is certified that error appears in the above-identified patent and that said Letters Patent are hereby corrected as shown below:

Column 2, line 38: "$(t_{21}ws)$" should be --$(t_{21}w_s)$--

Column 7, line 55: "arives" should be --arrives--

Column 8, line 43: "$(t2ws)$" should be --$(t_{21}w_s)$--

Signed and Sealed this

Eleventh Day of January 1983

[SEAL]

Attest:

GERALD J. MOSSINGHOFF

Attesting Officer

Commissioner of Patents and Trademarks